(12) United States Patent
Jamil et al.

(10) Patent No.: US 7,757,046 B2
(45) Date of Patent: Jul. 13, 2010

(54) METHOD AND APPARATUS FOR OPTIMIZING LINE WRITES IN CACHE COHERENT SYSTEMS

(75) Inventors: Sujat Jamil, Chandler, AZ (US); Hang T. Nguyen, Tempe, AZ (US); Samantha J. Edirisooriya, Tempe, AZ (US); David E. Miner, Chandler, AZ (US); R. Frank O'Bleness, Tempe, AZ (US); Steven J. Tu, Phoenix, AZ (US)

(73) Assignee: Intel Corporation, Santa Clara, CA (US)

( * ) Notice: Subject to any disclaimer, the term of this patent is extended or adjusted under 35 U.S.C. 154(b) by 1901 days.

(21) Appl. No.: 10/262,363

(22) Filed: Sep. 30, 2002

(65) Prior Publication Data

US 2004/0064643 A1      Apr. 1, 2004

(51) Int. Cl.
*G06F 12/12* (2006.01)

(52) U.S. Cl. .................. 711/133; 711/159; 711/156

(58) Field of Classification Search ............... None
See application file for complete search history.

(56) References Cited

U.S. PATENT DOCUMENTS

| 5,809,525 | A  | * | 9/1998  | Bishop et al. ............... 711/122 |
| 5,913,021 | A  | * | 6/1999  | Masubuchi .................. 714/15   |
| 5,958,040 | A  | * | 9/1999  | Jouppi ....................... 712/207 |
| 6,954,206 | B2 | * | 10/2005 | Shimomura et al. ......... 345/535  |
| 2005/0027911 | A1 | * | 2/2005 | Hayter et al. ................ 710/62 |

* cited by examiner

*Primary Examiner*—Denise Tran
(74) *Attorney, Agent, or Firm*—Trop, Pruner & Hu, P.C.

(57) ABSTRACT

A method and apparatus for optimizing line writes in cache coherent systems. A new cache line may be allocated without loading data to fill the new cache line when a store buffer coalesces enough stores to fill the cache line. Data may be loaded to fill the line if an insufficient number of stores are coalesced to fill the entire cache line. The cache line may be allocated by initiating a read and invalidate request and asserting a back-off signal to cancel the read if there is an indication that the coalesced stores will fill the cache line.

15 Claims, 8 Drawing Sheets

METHOD AND APPARATUS FOR OPTIMIZING LINE WRITES IN CACHE COHERENT SYSTEMS

FIELD OF THE DISCLOSURE

This disclosure relates generally to the field of cache architectures. In particular, the disclosure relates to optimization of cache coherent write operations.

BACKGROUND OF THE DISCLOSURE

In a data processing system, a processor may be associated with one or more cache storage devices. These cache storage devices together with system memory are usually organized into hierarchies by size and/or speed to hold copies of more frequently used or more immediately required data. Such copies, when written to or when modified by a processor or processors may differ from other corresponding copies at various layers in the hierarchy. Therefore it is usually necessary to maintain coherence among the various copies.

Typically cache storage devices are organized internally into lines of sequential bytes of data, for example. When a new cache line is allocated, a line-fill from memory or from another cache storage in the hierarchy is typically requested. In many common cases, such organization may facilitate efficient prefetching of instructions and/or data during execution of a program or process.

In a multiprocessor cache coherent system, it may be generally assumed necessary for an agent to gain exclusive ownership of a cache line, before writing to and modifying that line. For example, another agent may already have a modified copy of the line in its local cache, and the portion of the line to be modified may range from a single byte up to the entire cache line. Therefore, an up-to-date copy of the line would be requested so that any partial line modifications can be merged with the most recent copy of the line. Other agents would also be notified of the change in status for the line.

Exclusive ownership may be achieved, for example, by generating an invalidating read request for the data. Such a request has two affects. It obtains the latest copy of the line from the other caching agents or memory. It also serves to invalidate all other copies of the line, so that the line can be exclusively owned and ready for modification by the requesting agent.

In certain specific applications, the portion of a cache line to be modified may most typically be an entire line. A graphics or video application, which writes to a display frame buffer may be an example of such an application. When a cache line corresponding to a frame buffer memory location is allocated, data that is loaded from the frame buffer memory location to fill the cache line may be completely overwritten with new data. Similarly, when a previously modified copy of the cache line is loaded from another cache in the hierarchy, it too may be completely overwritten. In such cases system bandwidth and power are wasted transferring unnecessary data. System performance may, therefore, suffer.

A typical multiprocessor cache coherent system may employ a cache coherence protocol, such as MESI, or MOESI and/or snoop response signals such as HIT to indicate whether or not an agent has a copy of the data and HITM to indicate whether or not it is modified. These two snoop response signals alone do not provide enough information to identify whether or not a data transfer is really warranted.

BRIEF DESCRIPTION OF THE DRAWINGS

The present invention is illustrated by way of example and not limitation in the figures of the accompanying drawings.

DETAILED DESCRIPTION

Figure 1:
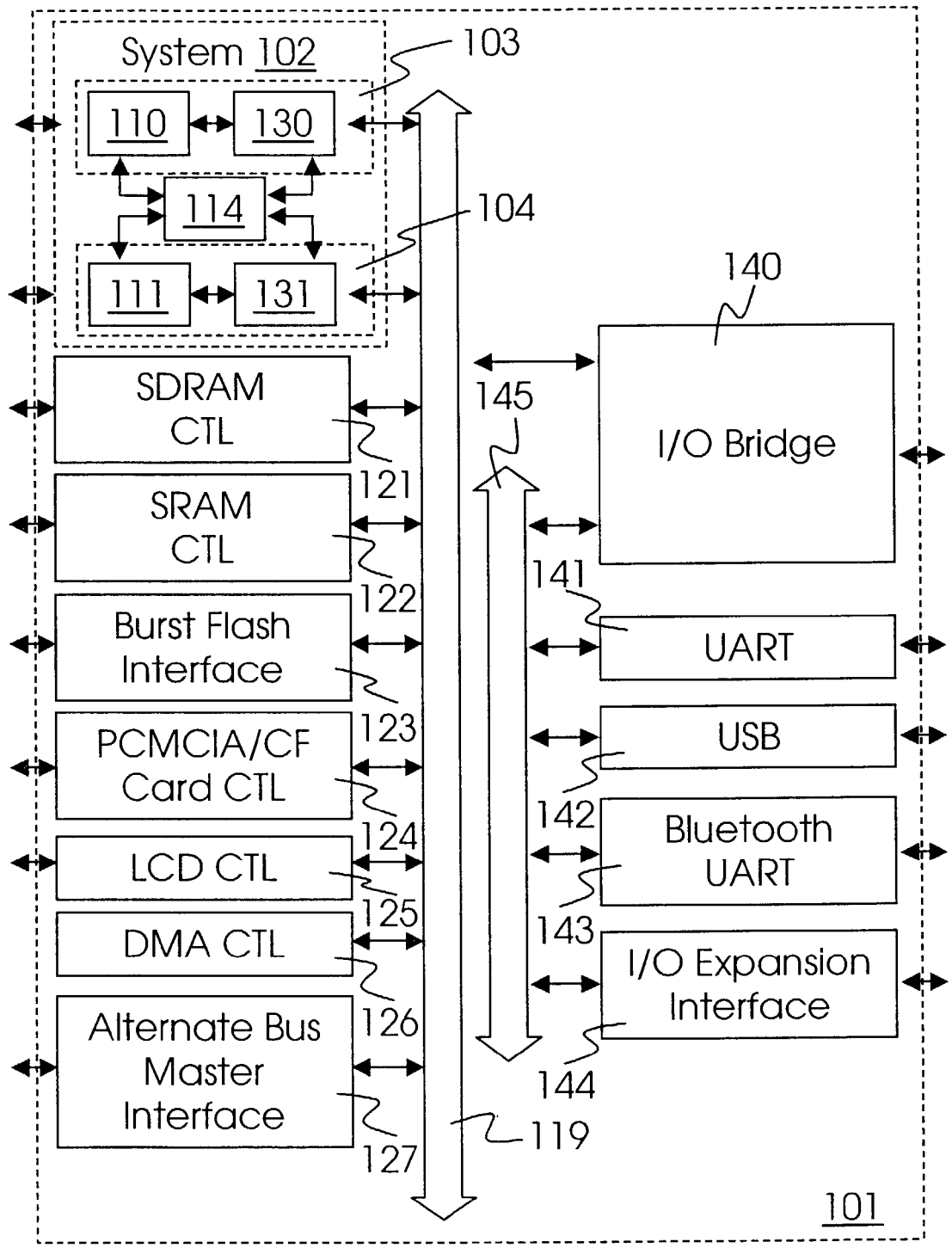
FIG. 1 illustrates one embodiment of a data processing system capable of optimizing line writes.

Disclosed herein is a process and an apparatus for optimizing line writes in cache coherent systems. Such optimizations may be used in single processor systems as well as in multiprocessor systems. Features of the coherency hierarchy provide for a new cache line being efficiently allocated without loading data to fill the line whenever a store buffer has coalesced enough stores to fill the cache line. Data may be loaded to fill the line if an insufficient number of stores are coalesced to fill the entire cache line. The cache line may be allocated by initiating a read and invalidate request and by asserting a back-off signal to cancel the read if there is an indication that the coalesced stores will fill the cache line.

These and other embodiments of the present invention may be realized in accordance with the following teachings and it should be evident that various modifications and changes may be made in the following teachings without departing from the broader spirit and scope of the invention. The specification and drawings are, accordingly, to be regarded in an illustrative rather than restrictive sense and the invention measured only in terms of the claims and their equivalents.

For the purpose of the following discussion of embodiments of the present invention, illustrative terms are used. Definitions for certain such illustrative terms follows.

A data processing system may be understood to mean any one of a variety of devices or systems for accessing data and/or communications. Examples include but are not limited to any combinations of one or more of the following: laptop computers, notebook computers; desktop computers, personal digital assistants, handheld computers, personal organizers; palmtop computers, pocket computers, cellular telephone/fax devices, game computers, digitizing tablet devices, electronic books, network appliances, digital audio recorder/players, multiprocessor systems, I/O system cards, daughter cards, motherboards or system-on-a-chip components.

A cache may be understood to mean any one of a variety of devices capable of storing and providing data. Examples include but are not limited to any combination of one or more of the following: write-through caches; write-back caches; write-allocate caches; victim caches; network caches; disk caches; write buffers and/or queues; line buffers and/or registers; or communication, I/O and/or entertainment buffers. A cache line is a plurality of associated bits or bytes and no particular method of access is implied. Any two cache lines may or may not be of lengths that are the same or are multiples of some common length. A cache is not necessarily included on the same die or in the same package as a processing device or an agent.

An agent in a system may be understood to mean any one of a variety of analog or digital devices, finite state machines, or interfaces for initiating, transferring, receiving, buffering, storing or sending signals including but not limited to addresses, control signals, instructions, coherency signals, interrupt signals, synchronization signals, identification signals, passwords, configuration signals, keep alive signals, routing signals, or data.

An allocation or a request for a cache line may be understood to mean any of a variety of types of transactions in various different kinds of single processor or multiprocessor memory hierarchies including but not limited to a line-fill request to memory, a request for ownership to modify a shared line, a request to update a modified shared line, a request to invalidate a shared line, a read and invalidate request, or a conditional read and invalidate request.

It will be appreciated that the invention may be modified in arrangement and detail by those skilled in the art without departing from the principles of the present invention within the scope of the accompanying claims and their equivalents.

Turning now to FIG. 1, one embodiment of a data processing system 101 capable of optimizing line writes is illustrated. One embodiment of data processing system 101 is an Intel® Personal Internet Client Architecture (Intel® PCA) applications processors with Intel XScale™ technology (as described at http://developer.intel.com) but the invention is not so limited.

Data processing system 101 comprises a cache coherent processing system 102 capable of optimizing line writes. For one embodiment of processing system 102, a processing device 110 is coupled with a cache storage 130, together constituting an agent 103; and a processing device 111 is coupled with a cache storage 131, together constituting an agent 104.

For one alternative embodiment of data processing system 101, agent 103 and agent 104 may share data coherently via cache storage 130, cache storage 131 and control logic 114. Processing system 102 is coupled with bus 119 for communicating with various other system devices, which may include but are not limited to, for example, synchronous dynamic random access memory (SDRAM) control 121, static random access memory (SRAM) control, burst flash memory interface 123, personal computer memory card international association (PCMCIA)/compact flash (CF) card control 124, liquid crystal display (LCD) control 125, direct memory access (DMA) controller 126, and alternative bus master interface 127.

Data processing system 101 may also comprise an I/O bridge 140 for communicating with various I/O devices via an I/O bus 145. Such I/O devices may include but are not limited to, for example, universal asynchronous receiver/transmitter (UART) 141, universal serial bus (USB) 142, Bluetooth wireless UART 143 and I/O expansion interface 144.

Alternative embodiments of data processing system 101 provide for high performance graphics, for example, through optimized line writes to frame buffer memory through cache storage. When a cache line corresponding to a frame buffer memory location is allocated, data loaded from the frame buffer memory location to fill the cache line may be completely overwritten with new data. In such circumstances, agent 103 or agent 104 together with control logic 114 may allocate cache lines without loading data associated with the corresponding frame buffer memory locations, from the frame buffer memory or from the respective other cache storage where such data may reside.

Figure 2:
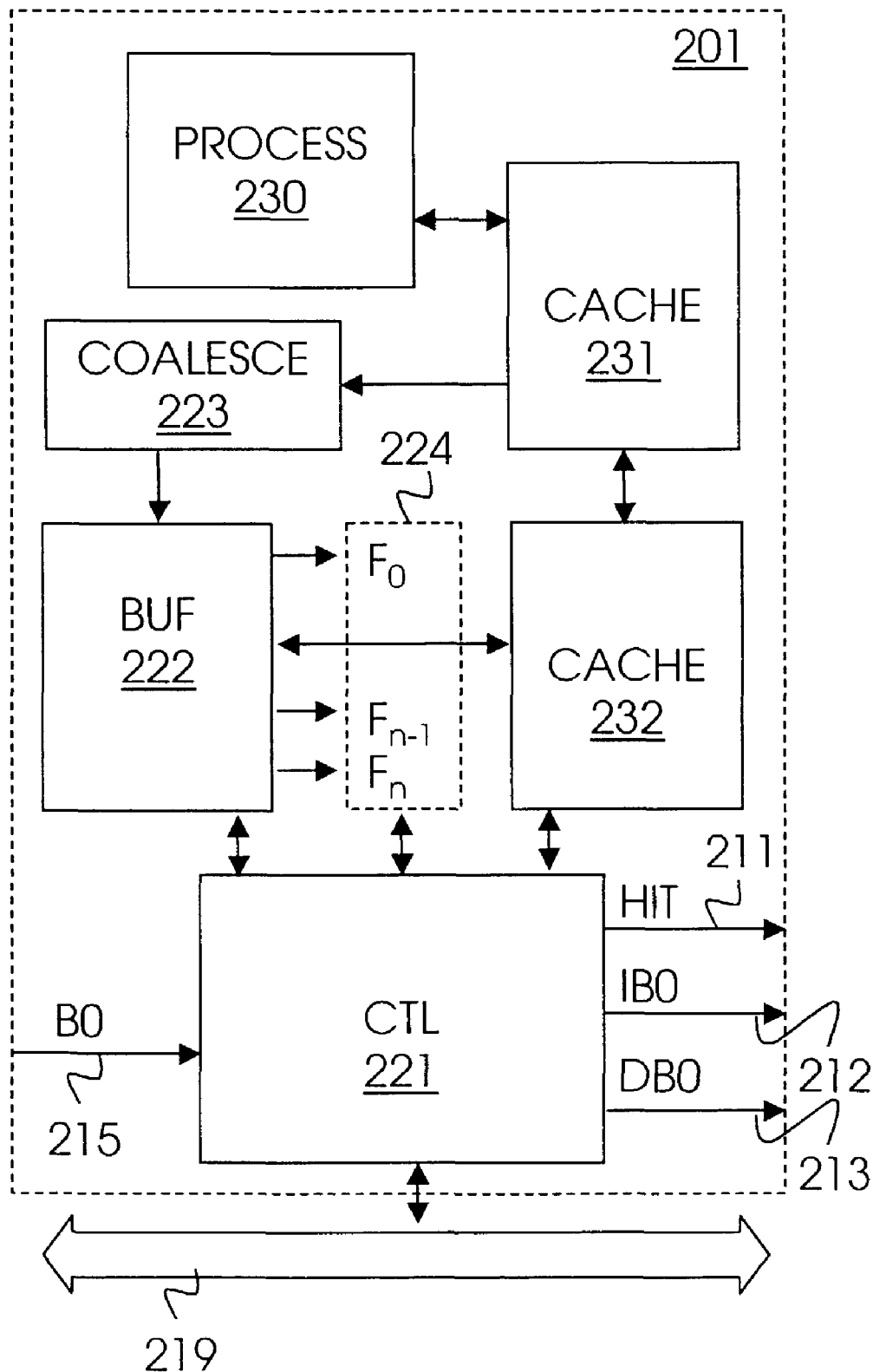
FIG. 2 illustrates one embodiment of an agent capable of optimizing line writes.

Turning next to FIG. 2 one embodiment of an agent 201 capable of optimizing line writes is illustrated. One embodiment of agent 201 comprises processing logic 230, optional cache 231, and cache 232. For one alternative embodiment of agent 201, optional cache 231 may be a write-through cache or a write-back cache. For another alternative embodiment of agent 201, optional cache 231 may simply be one or more data latches or registers.

Processing logic 230 may perform data write operations, for which optional cache 231 and/or cache 232 are to store a copy of the data. A sequence of such data write operations may be coalesced by coalesce logic 223 and buffered in buffer 222. A set 224 of flags $F_0$-$F_n$ indicates, for corresponding storage locations in buffer 222, whether a full cache line of data write operations has been coalesced. In response to one or more write operations, a corresponding cache line with permission to modify may be allocated. Optional cache 231 and/or cache 232 may be accessed to determine if a valid copy of the line is already present and the set 224 of flags may be searched to determine if enough writes have been coalesced to overwrite the entire line. In such cases, allocation of the line may be completed without requiring a line-fill data transfer.

One alternative embodiment of agent 201 further comprises control logic 221 to facilitate cache coherency with memory and/or other processing devices of a system. Responsive to one or more data write operations, control logic 221 may determine whether agent 201 has stored in optional cache 231 and/or in cache 232 a corresponding cache line and may allocate a cache line if necessary. For one embodiment of control logic 221, exclusive ownership of a cache line may be allocated through a read and invalidate request regardless of whether agent 201 has stored in optional cache 231 and/or in cache 232 the corresponding cache line. For one alternative embodiment of control logic 221, a data back-off, DB0 signal 213 may be asserted responsive to its own read and invalidate request when agent 201 has the corresponding cache line stored in optional cache 231 and/or in cache 232 and/or in buffer 222 resulting from a full cache line of data write operations. For one alternative embodiment of control logic 221, an intervention back-off, IB0 signal 212 may be asserted whenever DB0 signal 213 may be asserted.

For one embodiment of agent 201, back-offs replace a hit-modified signal, HITM, to provide for enough information to determine whether a line transfer is warranted and to cancel unwarranted transfers. The function of back-offs, B0 signal 215, DB0 signal 213 and IB0 signal 212 in relationship to other system agents will be illustrated in greater detail in the discussions with reference to FIGS. 3a and 3b below.

Figure 3A:
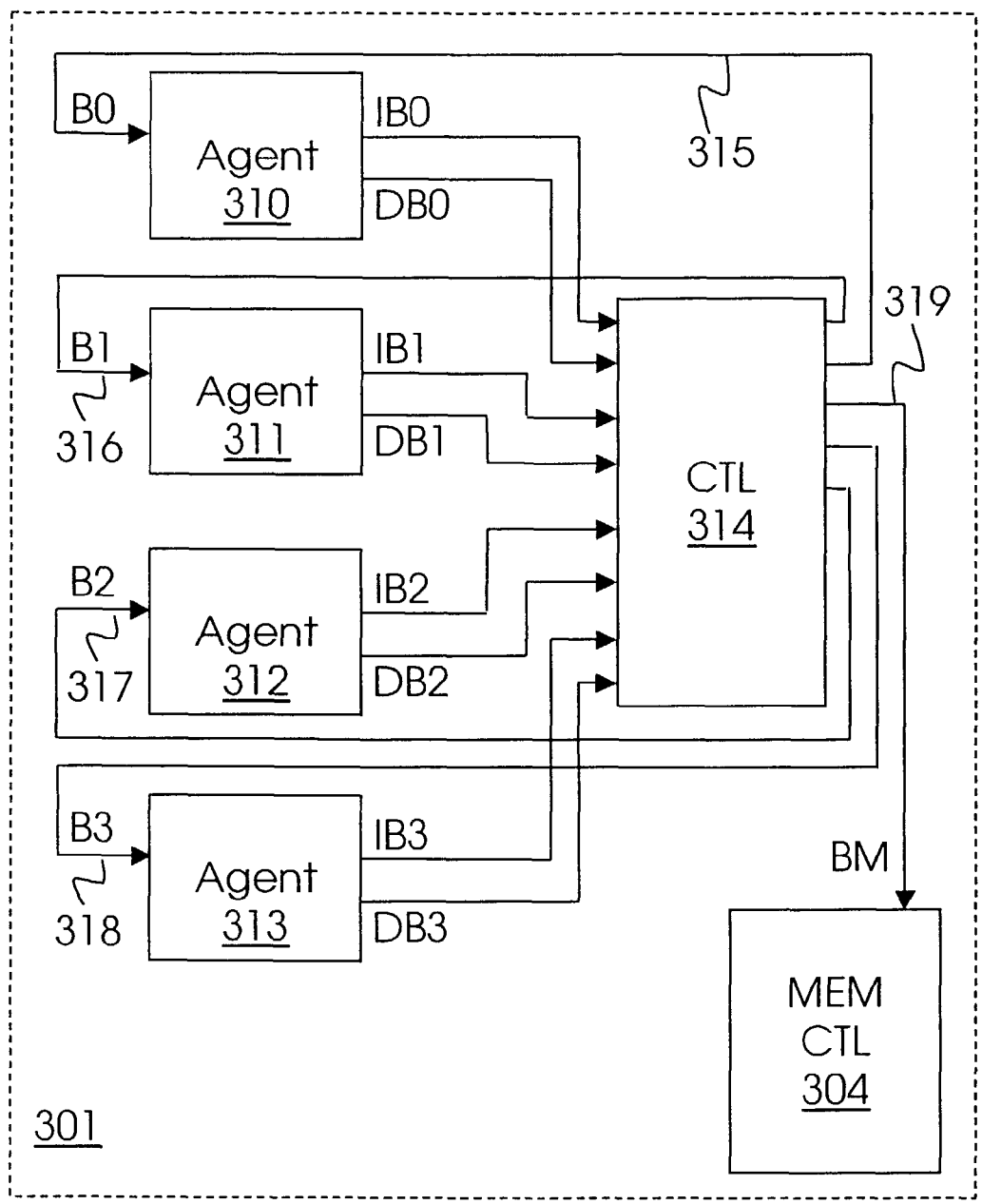
FIG. 3a illustrates one alternative embodiment of a data processing system capable of optimizing line writes.

FIG. 3a illustrates one alternative embodiment of a data processing system 301 capable of optimizing line writes. Data processing system 301 illustrates an example of four agents, agent 310, agent 311, agent 312 and agent 313. For one embodiment of data processing system 301, agent 310 may assert the DB0 signal responsive to its own read and invalidate request when agent 310 has the requested cache line stored in cache and/or buffered from a full cache line of data write operations. Agents 311-313 may similarly assert signals DB1-DB3 responsive to their own respective requests. Any of agents 310-313 may assert signals IB0-IB3, respectively, in response to a request from any agent. Signals IB0-IB3 may be asserted to indicate when an agent has the requested cache line in a valid state (for example, modified, owned, shared or exlusive) and is capable of providing the requested cache line directly to the requesting agent. Therefore, agents 310-313, respectively, may also assert signals IB0-IB3 whenever signals DB0-DB3 may be asserted.

For one embodiment of data processing system 301, control logic 314 receives signals IB0-IB3 and signals DB0-DB3 and generates B0 signal 315 as input to agent 310, B1 signal 316 as input to agent 311, B2 signal 317 as input to agent 312, B3 signal 318 as input to agent 313, and BM signal 319 as input to memory control logic 304. B0-B3 and BM signals 315-318 and 319 are generated to indicate to agents 310-313 and memory control logic 304, respectively, that they should not provide the requested cache line. Therefore, whenever an agent 310-313 asserts a signal DB0-DB3 (and consequently asserts a signal IB0-IB3) responsive to their own request, control logic 314 may indicate to all other agents and to memory control logic 304 that they should not provide the requested cache line. Thus, data processing system 301 is capable of optimizing cache line writes when a requesting agent has the requested full cache line stored in cache and/or buffered from data write operations.

Figure 3B:
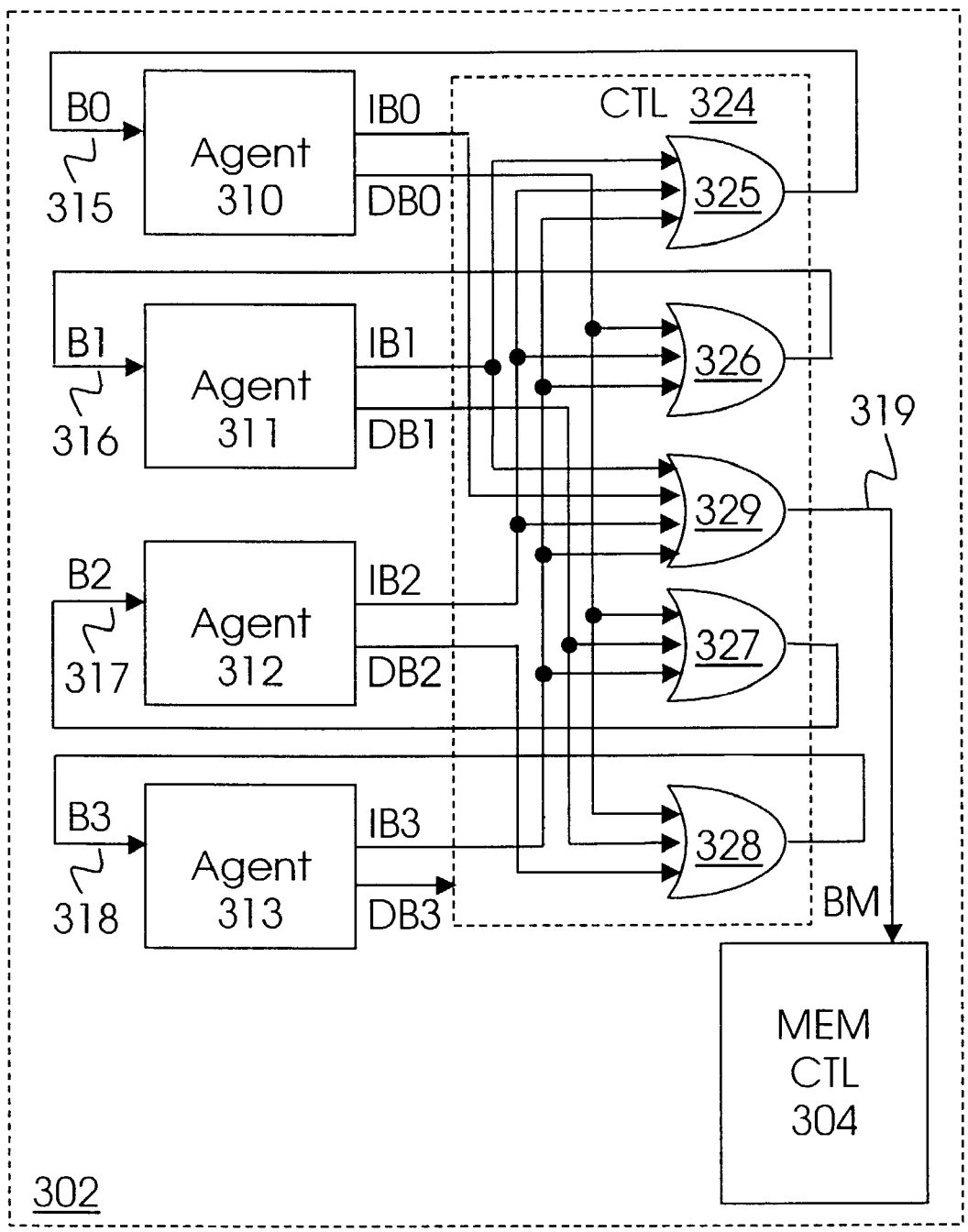
FIG. 3b illustrates another alternative embodiment of a data processing system capable of optimizing line writes.

FIG. 3b illustrates another alternative embodiment of a data processing system 302 capable of optimizing line writes. Data processing system 302 illustrates another example of four agents. Agents 310-313 may assert signals DB0-DB3 responsive to their own read and invalidate requests when they have the requested full cache line stored in cache and/or buffered from coalesced write operations. Any of agents 310-313 may assert signals IB0-IB3, respectively, in response to a request from any agent when an agent has the requested cache line in a valid state and is capable of providing the requested cache line directly to the requesting agent. Therefore, agents 310-313, respectively, may assert signals IB0-IB3 whenever signals DB0-DB3 may be asserted.

Control logic 324 receives signals IB0-IB3 and signals DB0-DB3 and generates B0 signal 315 as input to agent 310, B1 signal 316 as input to agent 311, B2 signal 317 as input to agent 312, B3 signal 318 as input to agent 313, and BM signal 319 as input to memory control logic 304 substantially as follows:

B0=IB1 OR IB2 OR IB3,
B1=DB0 OR IB2 OR IB3,
B2=DB0 OR DB1 OR IB3,
B3=DB0 OR DB1 OR DB2, and
BM=IB0 OR IB1 OR IB2 OR IB3.

B0-B3 and BM signals 315-318 and 319 are generated to indicate to agents 310-313 and memory control logic 304, respectively, that they should not provide the requested cache line. Thus, data processing system 302 is capable of optimizing cache line writes when a requesting agent has the requested full cache line stored in cache and/or buffered from coalesced write operations.

Figure 4:
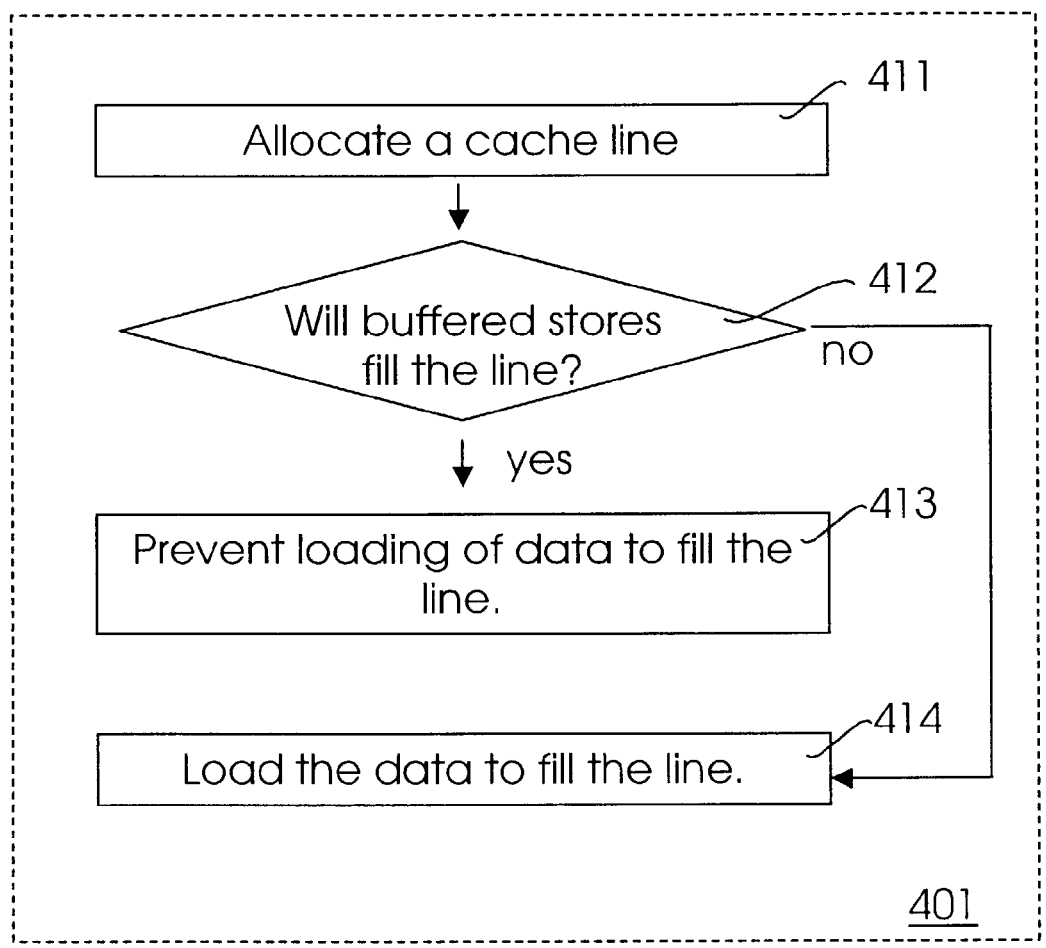
FIG. 4 illustrates a flow diagram for one embodiment of a process to optimize line writes.

FIG. 4 illustrates a flow diagram for one embodiment of a process 401 to optimize line writes. Process 401 and other processes herein disclosed are performed by processing blocks that may comprise dedicated hardware or software or firmware operation codes executable by general purpose machines or by special purpose machines or by a combination of both.

In processing block 411 a cache line is allocated. Processing proceeds to processing block 412 where it is determined if buffered stores will fill the cache line. If so, processing continues in processing block 413 where loading of data to fill the cache line is prevented. Otherwise processing proceeds to processing block 414 where data is loaded to fill the line.

It will be appreciated that process 401 may provide for reduced bandwidth requirements and power consumption in applications, which initialize or overwrite large portions of data. In such applications, process 401 may also provide for an increase in system performance.

Figure 5:
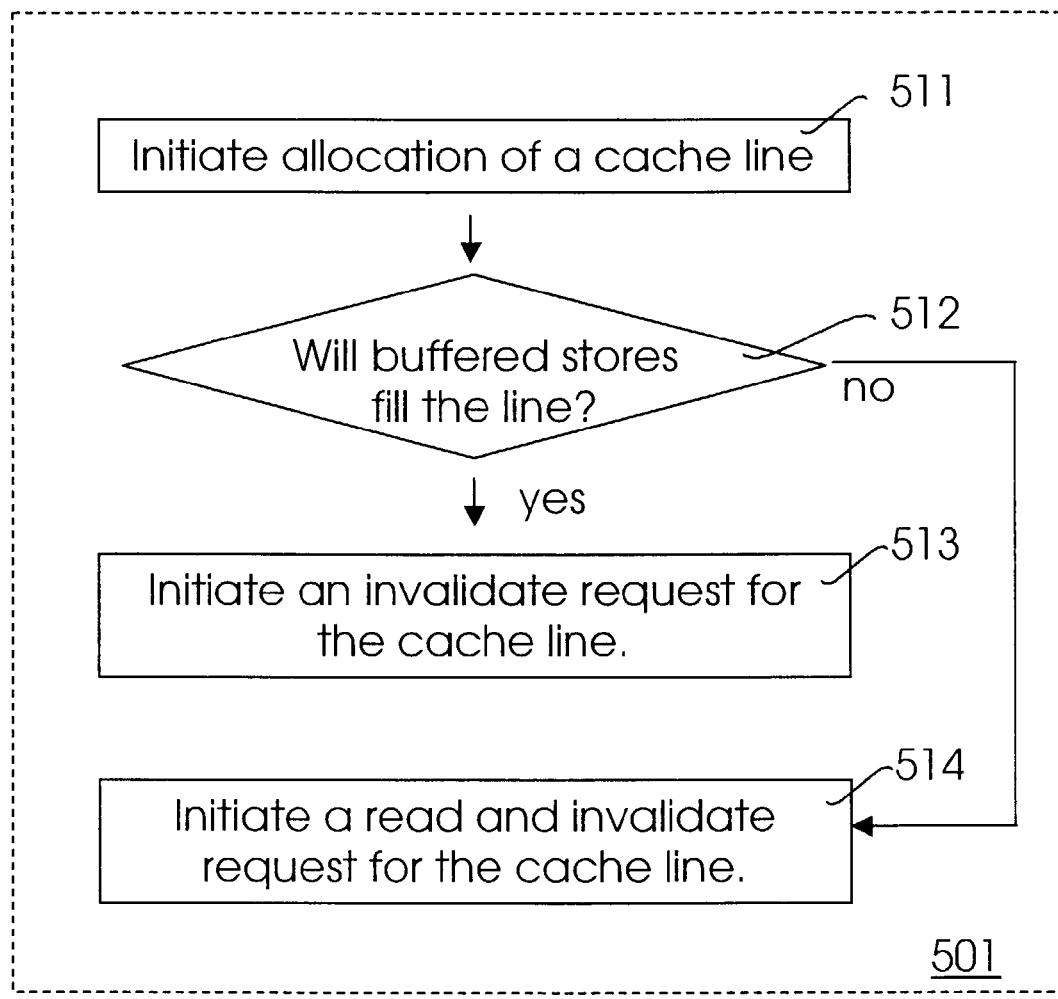
FIG. 5 illustrates a flow diagram for an alternative embodiment of a process to optimize line writes.

FIG. 5 illustrates a flow diagram for an alternative embodiment of a process 501 to optimize line writes. In processing block 511 allocation of a cache line is initiated. Processing proceeds to processing block 512 where it is determined if buffered stores will fill the cache line. If so, processing continues in processing block 513 where an invalidate request is initiated for the cache line. Otherwise processing proceeds to processing block 514 where a read and invalidate request is initiated for the cache line.

Figure 6:
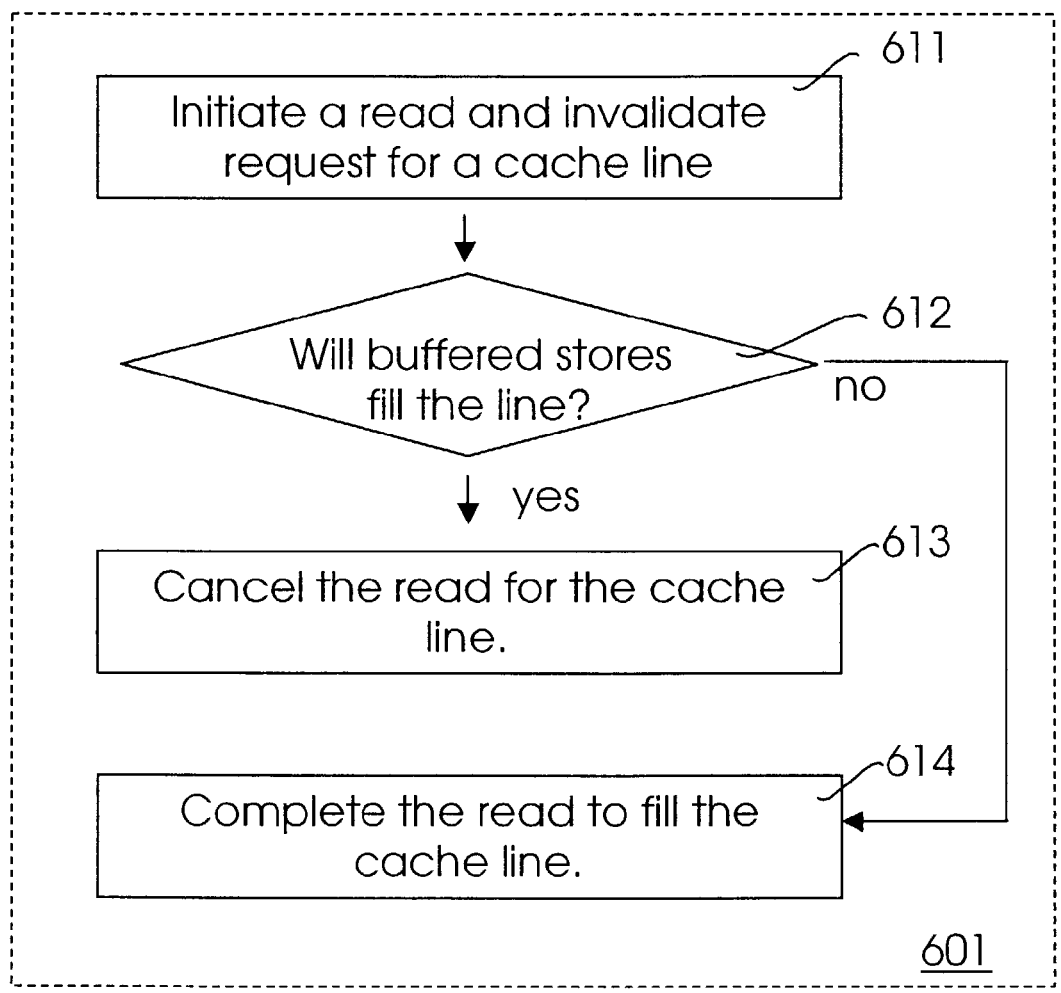
FIG. 6 illustrates a flow diagram for another alternative embodiment of a process to optimize line writes.

FIG. 6 illustrates a flow diagram for another alternative embodiment of a process 601 to optimize line writes. In processing block 611 allocation of a cache line through a read and invalidate request is initiated. Processing proceeds to processing block 612 where it is determined if buffered stores will fill the cache line. If so, processing continues in processing block 613 where the read is canceled for the cache line. Otherwise processing proceeds to processing block 614 where the read and invalidate request is completed for the cache line.

Figure 7:
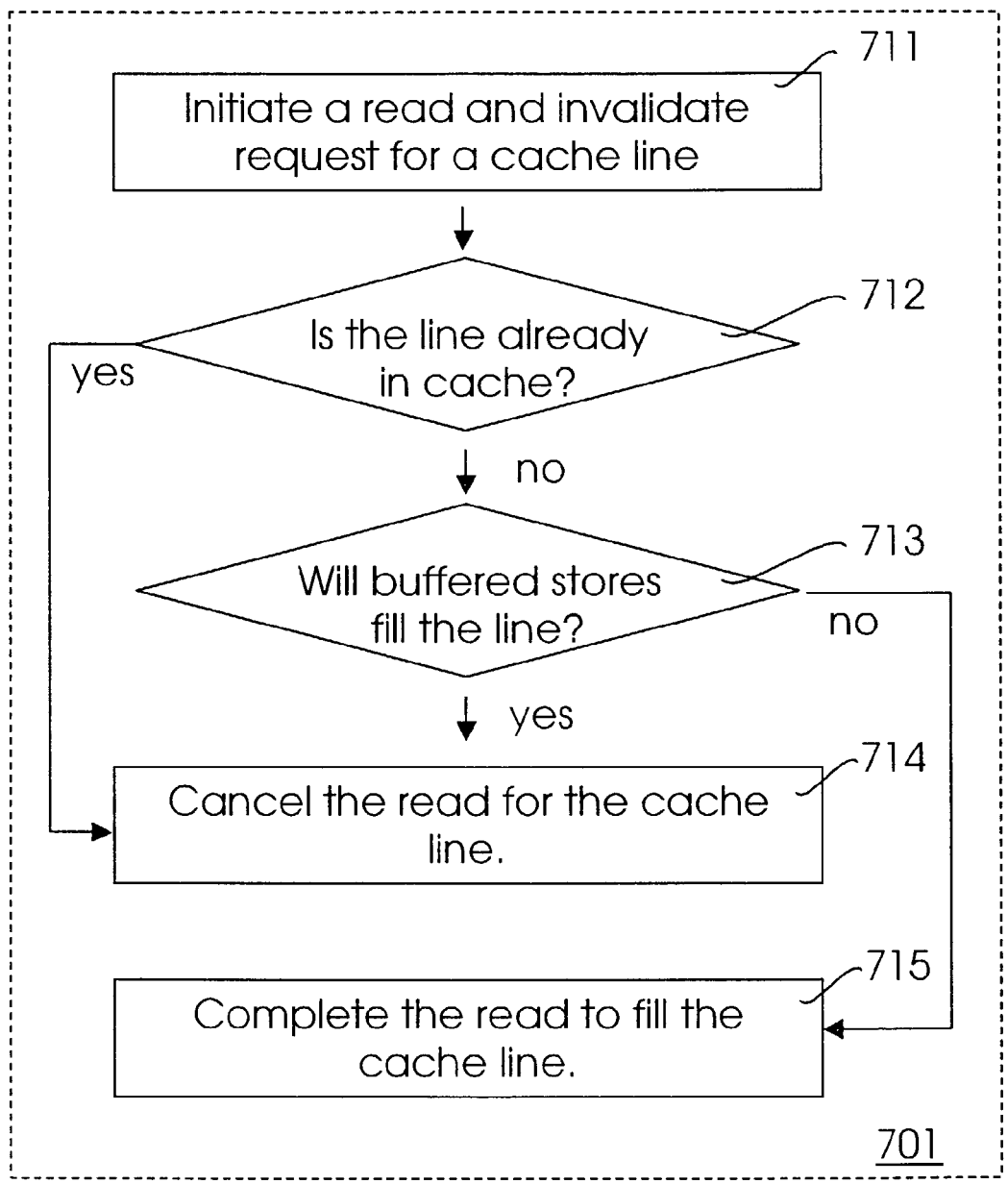
FIG. 7 illustrates a flow diagram for another alternative embodiment of a process to optimize line writes.

FIG. 7 illustrates a flow diagram for another alternative embodiment of a process 701 to optimize line writes. In processing block 711 a read and invalidate request is initiated for a cache line. Processing proceeds to processing block 712 where it is determined if the valid cache line is already in cache. If so, processing continues in processing block 714 where the read is canceled for the cache line. Otherwise processing proceeds to processing block 613 where it is determined if buffered stores will fill the cache line. If so, processing continues in processing block 714 where the read is canceled for the cache line. Otherwise processing proceeds to processing block 715 where the read and invalidate request is completed for the cache line.

The above description is intended to illustrate preferred embodiments of the present invention. From the discussion above it should also be apparent that especially in such an area of technology, where growth is fast and further advancements are not easily foreseen, the invention may be modified in arrangement and detail by those skilled in the art without departing from the principles of the present invention within the scope of the accompanying claims and their equivalents.

What is claimed is:

1. A method comprising:
    allocating a new cache line corresponding to a memory location without loading data associated with the memory location to fill the new cache line if a coalesced plurality of write operations present in a location of a buffer is sufficient to fill the new cache line;
    initiating a read and invalidate request to allocate the new cache line; and
    canceling the read from another memory if the coalesced plurality of write operations is sufficient to fill the new cache line.

2. The method of claim 1 further comprising:
    canceling the read from another cache.

3. The method of claim 1 further comprising:
    canceling the read from an external memory.

4. An article of manufacture comprising a machine-accessible non-transitory medium including data that, when accessed by a machine, cause the machine to perform the method of claim 1.

5. A method comprising:
    allocating a cache line via initiation of a read and invalidate request;

completing the read to load data to fill the cache line responsive to an indication that a coalesced plurality of buffered stores present in a store buffer does not fill the cache line; and canceling the read to not load data to fill the cache line responsive an indication that the coalesced plurality of buffered stores does fill the cache line, and instead filling the cache line with the coalesced plurality of buffered stores.

6. The method of claim 5 further comprising:

responsive to the indication that the plurality of buffered stores does fill the cache line, asserting a back-off signal to prevent the loading of data to fill the cache line.

7. An article of manufacture comprising a machine-accessible non-transitory medium including data that, when accessed by a machine, cause the machine to perform the method of claim 5.

8. An apparatus comprising:

a store buffer to hold a coalesced plurality of stores;

a flag associated with the store buffer to indicate whether the coalesced plurality of stores fills a cache line; and control logic coupled with the store buffer to allocate the cache line, the control logic to load data to fill the cache line responsive to said flag indicating that the coalesced plurality of stores does not fill the cache line, and the control logic to not load data to fill the cache line responsive to the flag indicating that the coalesced plurality of stores does fill the cache line, wherein the control logic is to allocate the cache line by initiation of a read and invalidate request for the cache line responsive to said flag indicating that the coalesced plurality of stores does not fill the cache line, and initiate an invalidate request for the cache line responsive to the flag indicating that the coalesced plurality of stores does fill the cache line.

9. The apparatus of claim 8 wherein the control logic is to allocate the cache line by a initiation of the read and invalidate request for the cache line and assertion of a back-off signal responsive to the flag indicating that the coalesced plurality of stores does fill the cache line.

10. The apparatus of claim 8 wherein the control logic responsive to said flag indicating that the coalesced plurality of stores does not fill the cache line, is to perform a line fill from external memory prior to writing the coalesced plurality of stores to the cache line; and responsive to the flag indicating that the coalesced plurality of stores does fill the cache line, perform no line fill prior to writing the coalesced plurality of stores to the cache line.

11. A data processing system comprising:

an addressable memory to store display frame data;

a first agent including:

a first buffer to hold a plurality of stores; and a first cache control logic coupled with the first buffer to allocate a cache line through a read and invalidate request, the first cache control logic to signal to load data to fill the cache line responsive to a flag associated with the first buffer that indicates that one or more buffered stores of the plurality of stores stored in the first buffer would not fill the cache line, and the first cache control logic to cancel the read and to signal not to load data to fill the cache line responsive to a search of the flag that indicates that a coalesced set of stores of the plurality of stores would fill the cache line; and memory control logic coupled with the addressable memory and responsive to the cache control logic signaling to load data, to transfer display frame data to fill the cache line, and responsive to the cache control logic signaling not to load data, not to transfer display frame data to fill the cache line.

12. The computing system of claim 11 wherein the cache control logic signaling not to load data to fill the cache line comprises asserting a back-off signal.

13. The computing system of claim 11 further comprising:

a second agent including:

a cache storage to store display frame data; and a second cache control logic coupled with the cache storage and responsive in part to the first cache control logic signaling to load data, to transfer display frame data to fill the cache line, and responsive in part to the first cache control logic signaling not to load data, not to transfer display frame data to fill the cache line.

14. The computing system of claim 13, wherein the second cache control logic is to further assert an intervention back-off signal to indicate that the second agent has the cache line in a valid state.

15. The computing system of claim 13, wherein the memory control logic is to generate a back-off signal to indicate that the second agent should not provide the cache line when the first cache control logic signals not to load data.

* * * * *